(12) United States Patent
Cobbold

(10) Patent No.: US 7,974,771 B2
(45) Date of Patent: Jul. 5, 2011

(54) METHOD AND APPARATUS FOR ENABLING COMMUTER GROUPS

(75) Inventor: Mark Cobbold, Stittsville (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1021 days.

(21) Appl. No.: 11/525,615

(22) Filed: Sep. 22, 2006

(65) Prior Publication Data

US 2008/0077309 A1    Mar. 27, 2008

(51) Int. Cl.
*G06F 19/00* (2011.01)

(52) U.S. Cl. ............. 701/117; 701/24; 701/25; 701/33; 701/36; 701/201; 707/E17.032

(58) Field of Classification Search .......... 701/24, 701/25, 33, 36, 117, 118, 201; 342/357.09, 342/357.1; 455/39, 456.6; 709/202; 707/E17.032; 719/317
See application file for complete search history.

(56) References Cited

U.S. PATENT DOCUMENTS

| | | | |
|---|---|---|---|
| 6,247,005 B1 | 6/2001 | Edwards et al. | |
| 2002/0032722 A1* | 3/2002 | Baynes et al. | 709/202 |
| 2002/0107027 A1 | 8/2002 | O'Neil | |
| 2003/0100993 A1 | 5/2003 | Kirshenbaum et al. | |
| 2003/0208313 A1 | 11/2003 | Wells et al. | |
| 2004/0049424 A1* | 3/2004 | Murray et al. | 705/14 |
| 2004/0158483 A1 | 8/2004 | Lecouturier | |
| 2004/0233070 A1 | 11/2004 | Finnern | |
| 2005/0222755 A1 | 10/2005 | Tengler et al. | |
| 2005/0227676 A1 | 10/2005 | De Vries | |
| 2005/0288046 A1 | 12/2005 | Zhao et al. | |
| 2006/0100779 A1 | 5/2006 | Vergin | |
| 2006/0178949 A1 | 8/2006 | McGrath | |

FOREIGN PATENT DOCUMENTS

| | | |
|---|---|---|
| DE | 10 2005 051130 | 5/2007 |
| EP | 1 519 288 | 3/2005 |
| WO | WO 2004/001541 | 12/2003 |

OTHER PUBLICATIONS

International Search Report and Written Opinion from corresponding PCT application PCT/CA2007/0017702.
Viva Commute printout from web site www.vivacommute.ca (1 page).
C. Chen, et al., Freeway Performance Measurement System: Mining Loop Detector Data, Jul. 24, 2000, presentation at 80th Annual Meeting Transportation Research Board (16 pages).
European Search Report from corresponding EP application 07815891.2.

* cited by examiner

*Primary Examiner* — Gertrude Arthur Jeanglaud
(74) *Attorney, Agent, or Firm* — Withrow & Terranova, PLLC

(57) ABSTRACT

A commuter groups service (CGS) allows commuters to join commuter groups so that they are able to socialize while commuting. Through the commuter groups, the users may share commuting routes, traffic updates, road conditions, and other information. Group members may arrange car pools, short term riding arrangements, and may anonymously or directly contact each other. The CGS may collect group member position information, e.g. GPS information, to enable the CGS to calculate traffic conditions and to select location specific information for group members. The system may include an on-line service accessible through a computer or wireless networking device. The user may log into the CGS, create or modify a user profile, and join groups of their choosing. Groups may be associated with specific events or with getting to/from work. Commuter groups may be formed for commuters that use private vehicles and/or public transportation.

19 Claims, 5 Drawing Sheets

METHOD AND APPARATUS FOR ENABLING COMMUTER GROUPS

BACKGROUND

1. Field

The present invention relates to communication networks and, more particularly, to a method and apparatus for enabling commuter groups.

2. Description of the Related Art

Many people commute to and from work on a daily basis, often taking the same route or selecting between a few alternative routes. Although some people are lucky to have relatively short commutes, it is not unusual for commuting times for commuters to approach or exceed one hour each way each day. Similarly, people may commute to a particular event such as a hockey game, football game, or concert, and thus need to be at the same place at approximately the same time which may cause congestion in the vicinity of the event.

Various proposals have been made to make commuting more efficient. For example, several people have suggested tracking cars using GPS to provide up-to-the minute information on commute times along various routes in an area. Users of the system could then have access to this information to enable them to make decisions as to which route would be the best. For example, U.S. Patent Application Publication 2003/0208313 teaches a method of estimating real time traffic speeds using data from moving vehicles. The speed information and commuting time along various routes may be delivered to drivers over cell phones or Personal Digital Assistants (PDAs). Similarly, U.S. Patent Application Publication 2005/0288046 teaches a traffic notification system that includes a location determination system (of the user's car) and automatically notifies the user of traffic conditions. As another example, U.S. Patent Application Publication 2003/0100993 teaches a system that will analyze commute data and determine which commuters have similar start and end-points, and compute a set of routes to be used by those users.

Although all of these systems are able to generate route data, they do not change the fact that many commuters will be required to endure long commute times. Since a large proportion of commuters ride to and from work alone, commuting time is not conducive to social interactions. To the contrary, aggressive drivers and tension between drivers may frequently make the commute more difficult than it would otherwise need to be. Additionally, traffic congestion in the area surrounding an event may cause the experience of reaching the event to be negative, thus affecting the perceived value of attending similar events.

SUMMARY

A method and apparatus for enabling commuter groups allows commuters to join communities so that they are able to socialize while commuting to work, to events, or in other similar circumstances. Through the commuter groups, the users may share commuting routes and alternate routes that they use with each other, so that members may discover new routes to common destinations. They may also message with each other, for example when one member of the group has car trouble, to help each other. Members may share traffic updates, accident reports, and other items of current information with each other to enable the groups to collectively have a more pleasant commuting experience. The commuter groups may also be used to arrange car pools, shorter term riding arrangements for example when one member of the group needs a ride to work, and for other purposes. By enabling commuter groups, commuters with similar commutes, and hence similar interests, may exchange information with each other to foster comradery between commuters.

The commuter groups may be created for people driving in cars, may be established for commuters that take airplanes, trains, busses, subways, or other forms of public transportation, or may be established for commuters that use a combination of public and private transportation.

The system may include an on-line service accessible through a computer or wireless networking device. For example, the service may be accessed via cellular telephone, PDA, or other handheld device, or a device with a web-enabled browser. In one example, the service may be accessed via a user's automobile navigation system. The service may foster commuter groups by enabling group member interactions, anonymously if desired, to enable communities of commuters to be established. The service may also collect real-time information such as current road conditions and traffic information, and static information such as business location information, and transmit the information on demand or as determined by the system to the members of the commuter groups. Other features may be enabled as well as described in greater detail below.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
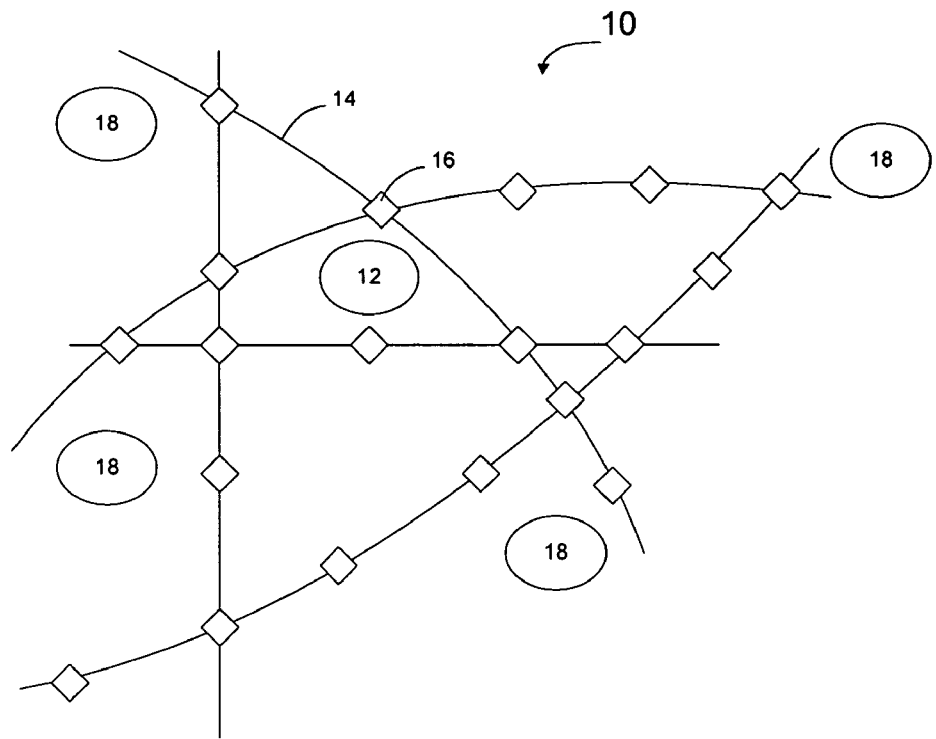
FIG. 1 is a functional block diagram of a hypothetical city.
Figure 2:
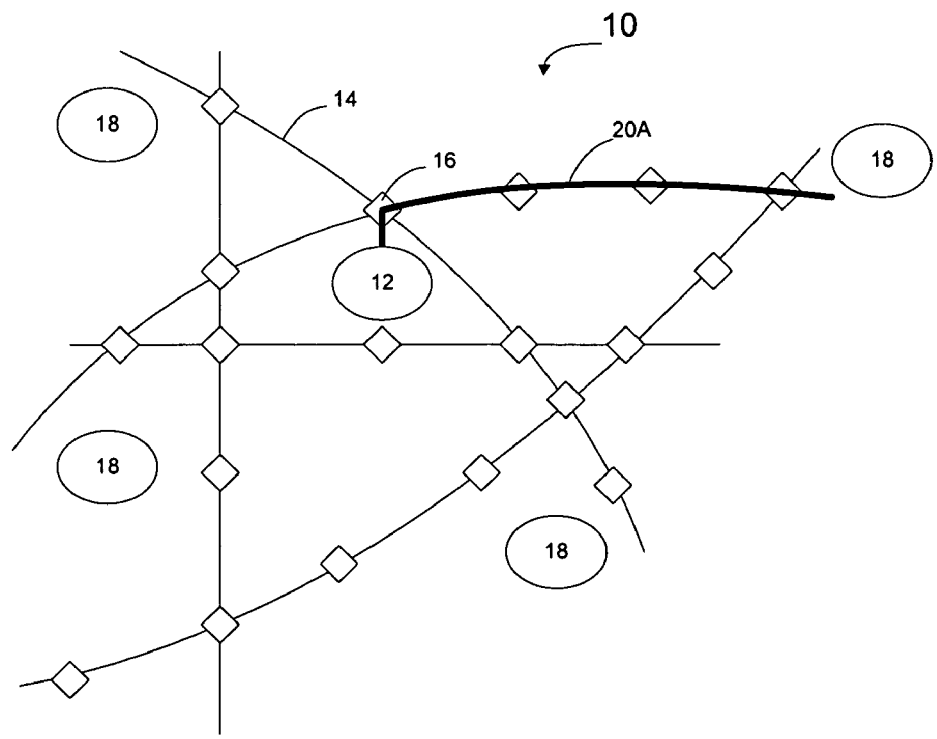
FIG. 2 is a functional block diagram illustrating a possible commuting route in the hypothetical city of FIG. 1.
Figure 3:
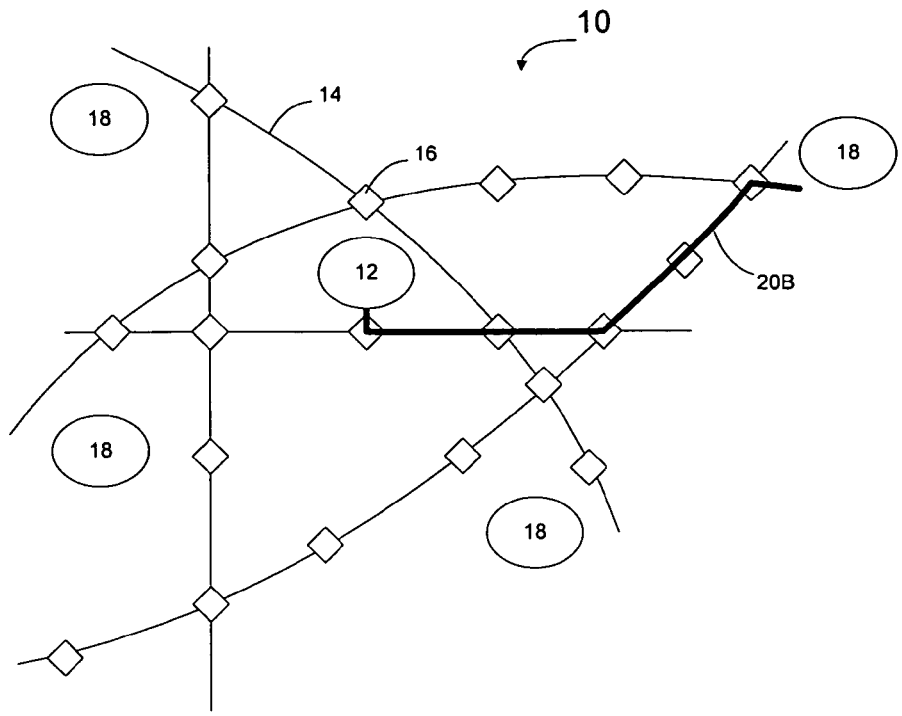
FIG. 3 is a functional block diagram illustrating an alternate commuting route in the hypothetical city of FIG. 1.

FIG. 1 a diagram of a hypothetical city 10 having a downtown area 12 and a freeway system including roads 14 and exits 16. Commuters that work in the city may live in towns outside the city, such as suburbs 18, and travel into the city on the roads 14. Generally, a given commuter will have a small number of routes that they will take to get into the city. For example, as shown in FIGS. 2 and 3, a given commuter may have several alternate routes 20A, 20B that they may take to get into the city, depending on traffic conditions on the freeway system. Often, many commuters living in the same suburb 18 will use similar routes to get into the city each morning and, similarly, will also travel these routes to return home at night.

Although an example has been provided of commuting routes into a city, different commuters may have commuting routes that extend wholly within the same city, may extend between cities, or may occur entirely within a rural area. Similarly, commuting routes may have two common end points or may have a single common end point, such as a common starting point or common destination. Commuting routes with only a single common end point may be, for example, associated with people attending an event such as a football game, soccer game, concert, or other event. The term commuting route will be used generically, and thus is not restricted to people commuting to work or to a commuting route that resembles the example routes shown in FIG. 1.

Commuting routes may include travel segments by private transportation such as via motorcycle or private car, or may include travel segments by public transportation such as train, commuter rail, subway, bus, airplane, helicopter, or other type of public transportation. Since many people travel by car, the description of the commuter group service will be focused at time on an implementation optimized to enable commuter groups for automobile drivers, the invention is not limited in this manner as the commuter groups service may be used by commuters that utilize other forms of transportation.

Figure 4:
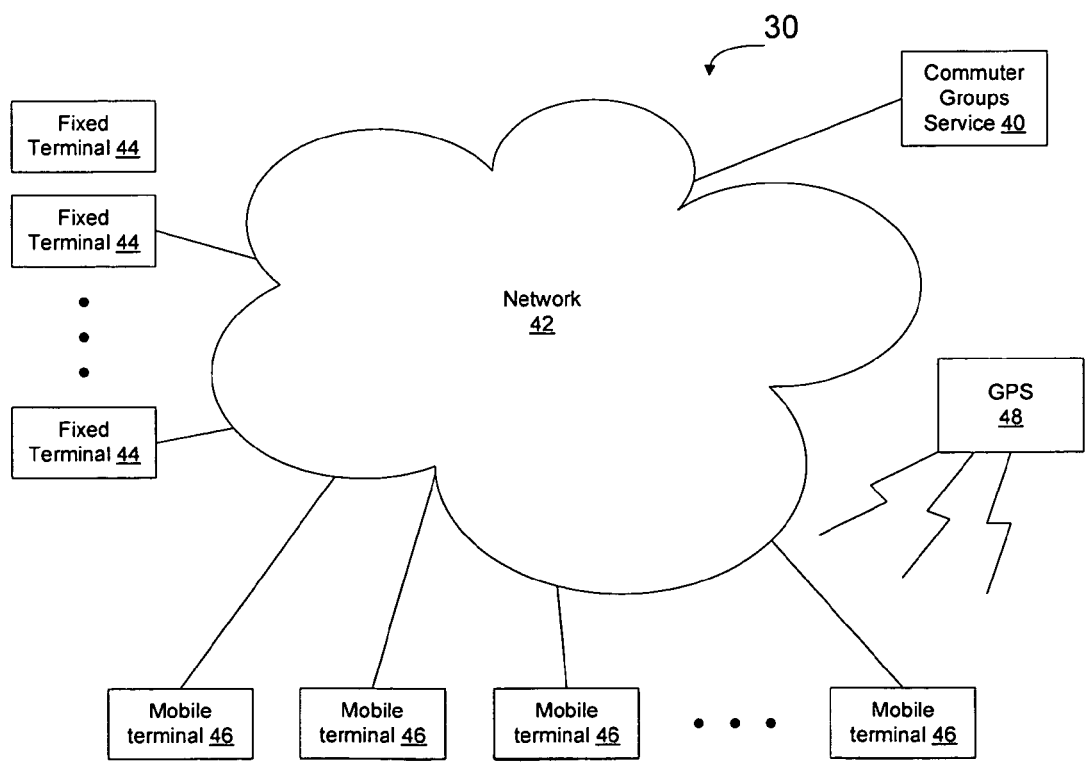
FIG. 4 is a functional block diagram of an example communication network architecture including a commuter groups service according to an embodiment of the invention.

According to an embodiment of the invention, a commuter groups service is implemented on a communication network to enable commuter groups to be established (see FIG. 4). The service may collect real-time information such as current road conditions and traffic information, and static information such as business location information, and transmit the information on demand or as deemed necessary to the members of the commuter groups. Users may also be able to search for information to obtain information of interest to them while driving, flying, using a train, or commuting in another way. The system may also interface users with each other to foster communication between users such as by providing users with anonymous or actual contact information that the group members may used to communicate with each other.

The commuter groups may enable commuters to join communities of similar commuters so that commuters with similar commuting patterns or interests may communicate with each other. Through the commuter groups service the users may share commuting routes and alternate routes that they use with each other. Users may also be allowed to search for alternate routes, people, and locations of interest. They may also message with each other, for example when one member of the group has car trouble, to help each other. Members may share traffic updates, accident reports, and other items of current information with each other to enable the groups to collectively have a more pleasant commuting experience. The commuter groups may also be used to arrange car pools, shorter term riding arrangements for example when one member of the group needs a ride to work, and for other purposes. By enabling commuter groups, commuters on the highway with similar commutes, and hence similar interests, may exchange information with each other to foster comradery between commuters.

FIG. 4 is a functional block diagram of a communication network architecture 30 implementing a commuter groups service according to an embodiment of the invention. As shown in FIG. 4, a commuter group service 40 may be implemented as a service such as a Web Service on a network 42 configured to interconnect users. The network may include portions of the Internet, Public Switched Telephone Network (PSTN), cellular wireless networks, wireless data networks such as WiFi or WiMax networks, and other types of networks, to enable fixed terminals 44 and wireless terminals 46 to obtain access to the commuter groups service 40. Although several types of networks have been described in connection with network 42, the invention is not limited to the particular type of network used to interconnect the users and the commuter groups service 40. Similarly, although an embodiment of the commuter groups service will be described as being implemented as a web service, the invention is not limited in this manner as the commuter groups service may be implemented using many different technologies.

Users of the commuter groups service 40 may access the service and other group members from a fixed terminal 44 such as a computer at their house, and may also access the service and other group members from a wireless terminal 46 such as a Personal Data Assistant (PDA), cellular phone, Blackberry, automobile navigation system, laptop computer, notepad, or other computing device configured to communicate using a wireless communication technology. Numerous ways of accessing the CGS 40 and communicating with other group members may be utilized and the invention is not limited to the particular ways users choose to interact with each other and the CGS.

Location information of users in the system may be determined using Global Positioning System (GPS) 48, cellular triangulation methods, or other methods of locating a mobile terminal. For example, the locations of users as they commute through the city may be detected by mobile terminals 46 configured to include a GPS receiver. The GPS location information may then be transmitted to the commuter groups service 40. Other location detection processes may be used as well, such as measuring the signal strength of transmissions from the user at access points that are able to receive signals from the user, and calculating the rough position of the user via triangulation from the received signals. The invention is not limited by the particular location system used to determine the location of the user.

Regardless of how it is obtained, the location information may be used by the commuter groups service 40 to detect the users' speeds and infer from the users' speeds the traffic conditions on the roads 14. The location information may also be used by the commuter groups service to provide location specific advertising to the users as they pass restaurants, gas stations, and other businesses along their commuting route.

Additionally, the location information may be used by the commuter groups service to determine which users of a particular commuter group are in relatively close proximity to each other on the road. The proximity information may enable users to message other users that are located close by so that the users may communicate about particular items of interest. For example, commuters may alert each other of particular road hazards, particularly annoying/aggressive drivers, and other items of interest to commuters in the same general area on the roadway. Similarly, the proximity information may enable users heading to an event to communicate with each other before getting to the event to ease tension associated with congestion as the users approach the event. Location information may be used in other ways as well and the invention is not limited to the use of location information only as set forth in these several selected examples.

Figure 5:
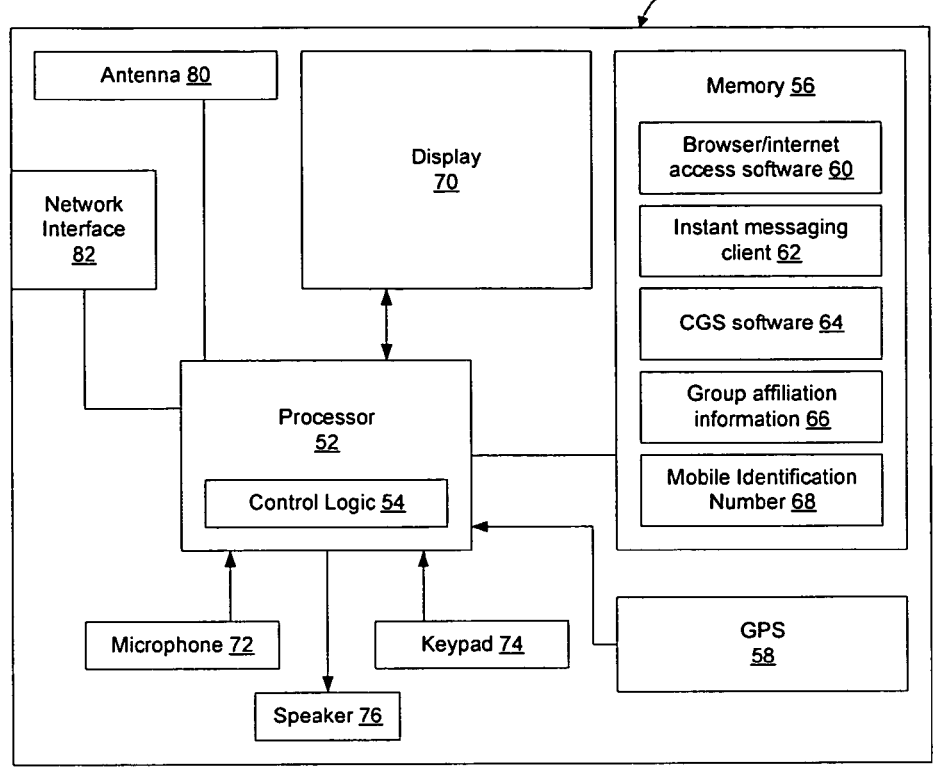
FIG. 5 is a functional block diagram of a user terminal configured to interact with the commuter groups service according to an embodiment of the invention.

FIG. 5 is a functional block diagram of a user terminal 50 that may be used to interact with the commuter groups service according to an embodiment of the invention. The user terminal may be implemented as a fixed terminal 44 or a mobile terminal 46 as described in connection with FIG. 4. Although a particular user terminal 50 will be described in greater detail herein, the invention is not limited to use with this particular example terminal as other user terminals may be used as well.

As shown in FIG. 5, the user terminal includes one or more processors 52 containing control logic 54 configured to load data and instructions from memory 56. The memory 56 may contain computer executable code or portions of code configured to enable the user terminal to communicate on the network 42 and to interact with the commuter groups service 40. For example, the memory 56 may include an internet browser or other internet access software 60 to enable the user terminal to communicate over the Internet. The memory may also contain an instant messaging client 62 configured to enable the user terminal to message other user terminals for real-time text based communication with the other terminals.

The memory 56 may also include commuter groups service client software 64 where the commuter groups service is created using a client-server architecture. For example, the commuter groups service client 64 may be configured to collect information from the user terminal such as group affiliation information 66, terminal specific information such as the terminal's mobile identification number 68, and pass that information to the commuter groups service. The client software may also interact with a GPS module 58 to obtain current location information of the terminal and pass that information to the CGS. Optionally, client software may be run as a background process to enable information about the user terminal to be transmitted periodically from the user terminal to the CGS without requiring intervention by the user.

Instead of running the client software transparently to the user, the client software may alternatively be implemented as an application through which the user may interact with the CGS and other group members. For example, the application may present the user with a user interface through which the user may access and modify the user's profile at the CGS, interact with the CGS during the commute, obtain traffic alerts and maps of congestion pertinent to their commuting route, obtain live video data of portions of an upcoming route, and otherwise be presented with information pertinent to the commute. The application may also maintain or retrieve contact information for other members of the group that are in the vicinity of the user to enable the users to message or talk with each other about the commute. Since the CGS knows the location of the group members, it may select sub-groups of members based on proximity to each other that are at approximately the same point in the commute to enable the members in the sub-groups to communicate with each other while traveling along the route.

The terminal may include one or more input/output devices such as a microphone 72, keypad 74 and speaker 76. Optionally, the display 70 may contain a pressure sensitive, light sensitive, or other type of sensitive display screen to enable the display itself to be used as an input device as well as an output device. Other input/output devices may be used as well and the invention is not limited to an embodiment that uses only these input/output devices or this particular selection of input/output devices.

Where the terminal 50 is configured to communicate using one or more wireless technologies, the user terminal 50 may be equipped with an antenna 80. Similarly, the terminal 50 may be provided with a network interface 82 to enable the terminal to be connected to the network via one or more fixed wires. The invention is not limited to the particular manner in which the terminal 50 is connected to the network 42.

Figure 6:
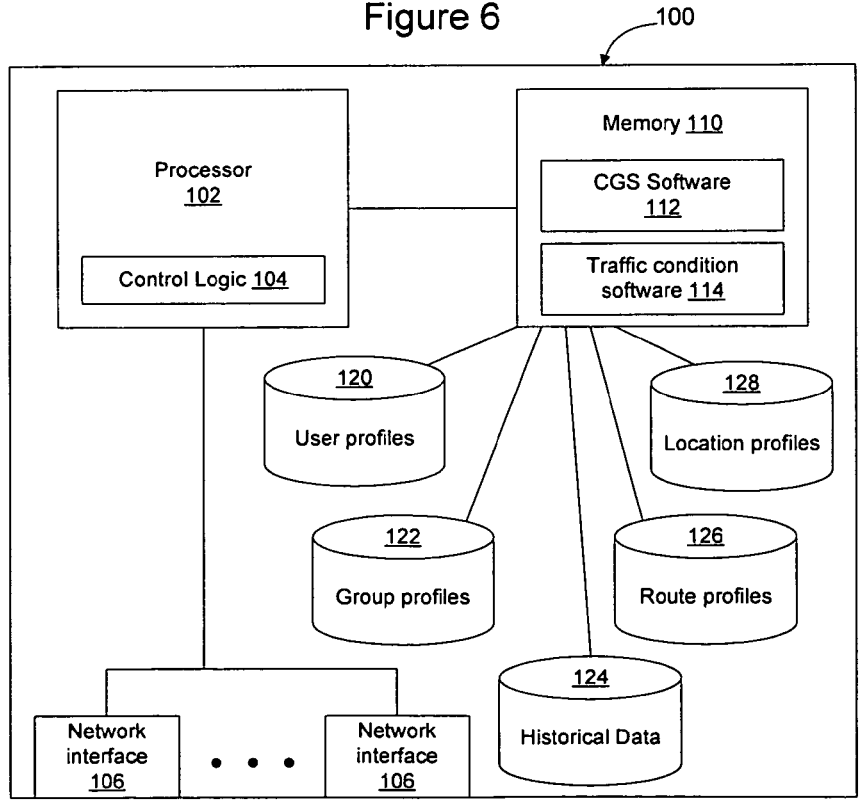
FIG. 6 is a functional block diagram of a computer platform configured to implement a commuter groups service according to an embodiment of the invention.

FIG. 6 is a functional block diagram of a computer platform such as a server containing CGS software that is configured to implement a commuter groups service 40 according to an embodiment of the invention. As shown in FIG. 6, the computer platform 100 may be implemented as a standard computer platform including one or more processors 102 configured to implement control logic 104. The computer platform may include one or more network interfaces 106 configured to enable the computer platform to receive communications from the network and output information and control commands onto the network. The computer platform may be implemented as a general purpose computer, a network element such as a router or switch, or as another type of computing device. Computer platforms generally include many additional components, which have been not described in detail since these additional components are common and well known to persons skilled in the art.

Figure 7:
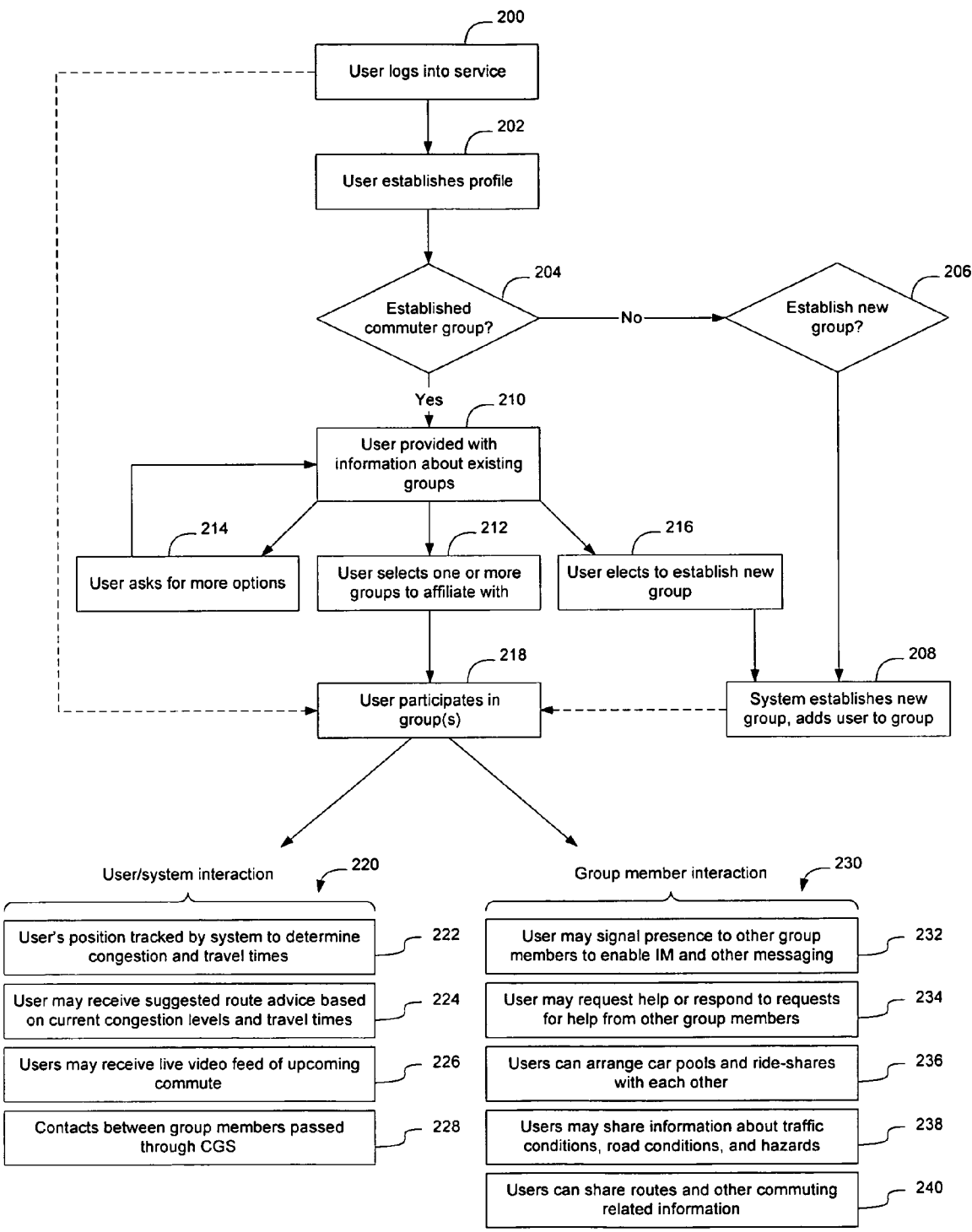
FIG. 7 is a flow chart illustrating an example process that may be used to enable a user to interact with the commuter groups service according to an embodiment of the invention.
Figure 8:
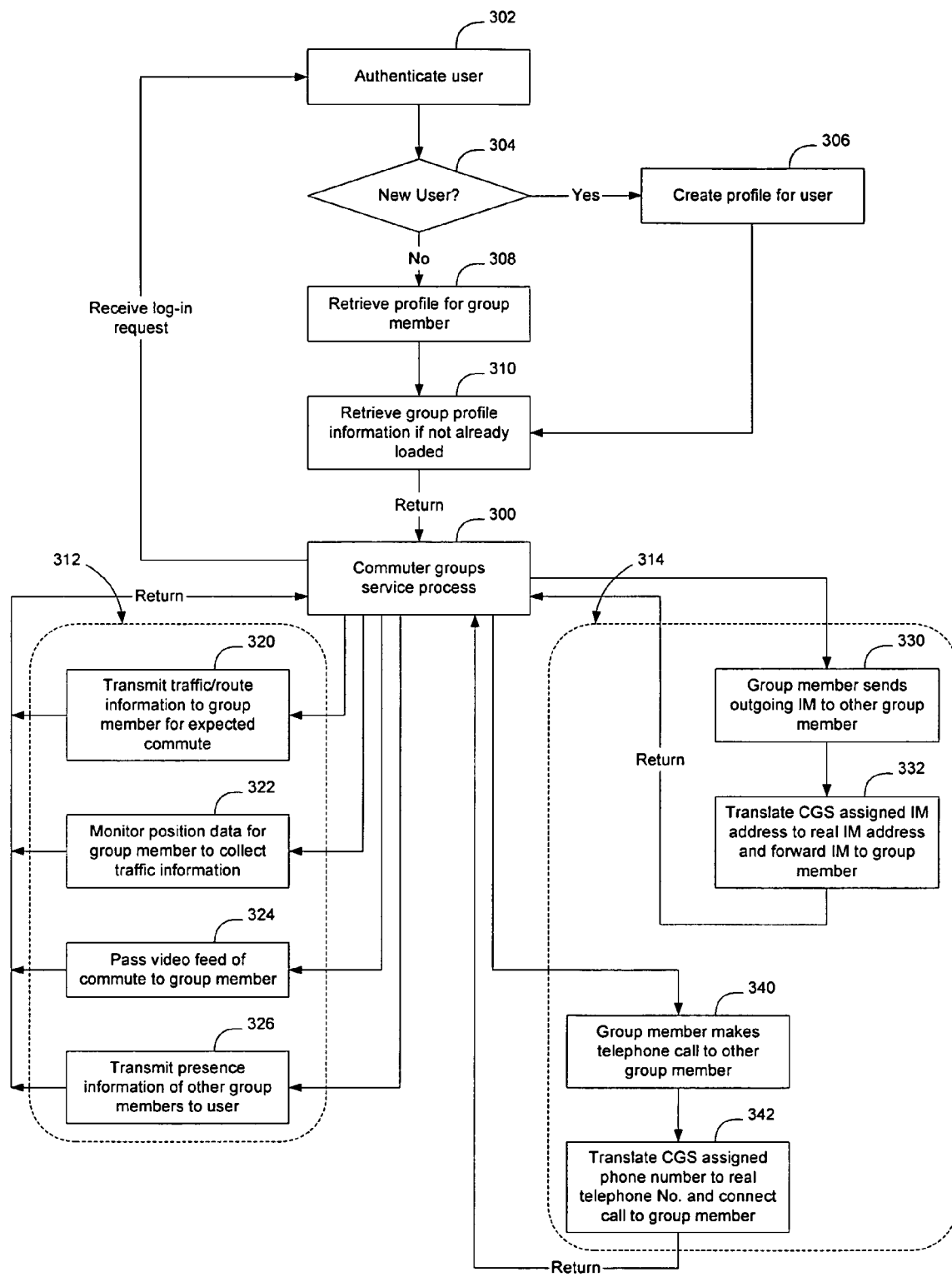
FIG. 8 is a flow chart illustrating a commuter groups service process according to an embodiment of the invention.

In the embodiment shown in FIG. 6, the computer platform 100 includes a memory 110 containing commuter group service software 112. The commuter groups service software is configured to implement the functions described herein in connection with the commuter groups service, for example, as shown in FIGS. 7 and 8. Additional details associated with the CGS software will be provided below in connection with these figures.

The memory 110 may also include traffic condition software 114, either as a separate module or as a portion of the CGS software 112. The traffic condition software 114 may process traffic information updates input by group members, received from independent traffic reporting services, or received from GPS information, and create traffic estimates for commuters in particular commuting groups. The memory 110 may also include other functional modules to enable it to perform specific functions described herein and associated with the CGS service, such as a communication module configured to handle instant messages and telephone calls between group members.

The computer platform may also contain or interface with one or more databases containing information for use by the CGS software 112. For example, the computer platform 100 may contain a user profiles database 120, group profiles database 122, historical data database 124, route profiles database 126, and location profiles database 128. Other databases may be used as well and the invention is not limited to an embodiment that includes only these selected databases or all of these selected databases. Similarly, two or more of the databases may be combined or merged together, depending on the particular implementation. Additionally, although an embodiment has been shown in which the databases are supported by the computer platform 100, the invention is not limited in this manner as the databases may be external to the computer platform and interfaced to the computer platform directly, via a local area network, or via network 42.

FIG. 7 is a flow chart illustrating an example process that may be used to enable a client to interact with the commuter groups service according to an embodiment of the invention. As shown in FIG. 7, when a user would like to interface with the CGS, the user will log into the service (200). The log-in process enables the client to be identified to the CGS so that user-specific services may be provided to the user. A generic log-in process may be used to enable the user to log into the CGS, such as by providing the user with a user interface that will enable the user to input a user ID and password. Optionally, the CGS may be configured to recognize user terminals as part of the initial log-in process so that one or more of the log-in screens may be pre-populated with information associated with an expected user of the terminal. Any desired log-in process may be used and the invention is not limited by the particular log-in process or method used to gain access to the CGS.

When a user logs into the CGS for the first time, the user will be provided with a user interface to enable the user to create a user profile (202). Optionally, CGS software 64 such as a cookie or other executable program may also be downloaded to the user terminal at this stage to enable the client terminal and CGS to exchange information more efficiently. If necessary, CGS software may be downloaded at the onset of the communication session between the CGS and the terminal, or at another stage of the process. The invention is not limited by the particular manner in which the CGS software is provided or to an embodiment in which CGS software is required to be instantiated on the user terminal.

The user profile may contain many different pieces of information, some of which may be required and other of which may be optional. For example, the user profile may contain information to enable the user to be identified to the CGS such as the user's actual name, phone number, e-mail address, instant messaging address, mobile identification number, credit card information, and other similar information. The user may also enter a group member services name or alias that the user would like to use in connection with communications with other group members. By enabling the user to coin a group member services name, the user's actual name may be withheld from other group members while enabling the group members to communicate with each other.

The user's profile may contain both public information to be shared with other group members and private information that is to be used only by the CGS. For example, the public information may include the group member's alias, assigned instant messaging address, assigned telephone number, or assigned contact code.

The instant messaging address, telephone numbers, and other information used to contact members of the group may be specific to the CGS system and not work outside of the CGS system. To enable this to work, the CGS will assign a code to each user that is associated with that user and which may be used to reach the user through the CGS system. When a user would like to contact another group member, the user may dial the CGS system and enter the code to cause the CGS system to put a call through to the other group member. By performing a translation of assigned code information to telephone number or IM address, the CGS system may allow group members to contact each other without requiring the users to share personal information before they get to know one-another.

Other information in the user's profile may be private information such as the group member's actual name, address, telephone numbers, and credit card information. Depending on the particular implementation, more or less information may be contained in the public and private aspects of the user's profile. Once a user establishes a profile, it may be edited at any time so that the user may update their profile.

As part of the profile creation process, the user may be prompted to enter information regarding the routes that the user routinely travels as part of a commuting process. For example, users may enter the start and end points of their typical commutes, approximate times of the day during which they commute, and the mode of transportation (public transportation or private vehicle) and if they commute by private automobile, the type of vehicle they typically use to commute. Based on this information, the system may determine if there are any established commuter groups that may be appropriate for the user to join (204).

The CGS may use a number of different criteria when searching for a candidate commuter group that the user may join. For example, the CGS may look at the starting and ending points on the commuter route to determine if there is an established commuter group for commuters that get on at the same highway entrance and/or get off at the same highway exit. The CGS may also look more broadly to find a commuter group that covers a range of entrances and exits that may cover the entrances/exits of the user.

The CGS may use other criteria to search for a candidate commuter group to be presented to the user. For example, a commuter group may be established for all users that use a particular highway to get to work in the morning. Alternatively, user hobbies, interests, careers, and other criteria may be used to create topic specific commuter groups or subgroups. Similarly, the CGS may look to determine if there is a commuter group associated with a particular event that the user is planning to attend. Other criteria may be used to determine whether a particular commuter group should be selected as a candidate commuter group for presentation to the user.

Once the user has established a profile, the CGS will determine if there are any established commuter groups that the user may be interested in joining. If there are no commuter groups, for example if the CGS is just being deployed in a particular geographic area or city, the commuter may be presented with the option of creating a new commuter group (206). If the user elects to establish a new commuter group, the CGS will establish a new commuter group, assign parameters to the commuter group, and add the user to the group (208).

If there are candidate commuter groups to be presented to the user, the user will be provided with information on the existing groups (210) and be provided with the opportunity to select one or more groups with which to affiliate (212). If the user is not satisfied with the groups that have been presented the user may request the CGS to broaden its search to provide the user with a larger list of candidate commuter groups (214). Alternatively, the user may ask the system to establish a new group (216) which will then cause the system to establish a new group and add the user to the group (208). The user may change group affiliation at any time by logging into the system and editing their profile on the system, so that group affiliation is not statically determined by the system but rather is dynamically controlled according to the user's preferences.

Once a user is a member of a group, the user may participate in the group 214. Participation in a group may require the user to log into a service 200 or may occur automatically when the user is commuting. For example, the CGS software 64 may be configured to transmit location information to the CGS system whenever it changes its location, or during pre-set times of the day. When the CGS sees location information from a known mobile terminal 46, it may automatically provide the user associated with that mobile terminal with access to the group. The authentication process used by the service to determine who is able to participate in a group may vary depending on the policy to be implemented by the CGS. For example, when a user joins a group, the mobile identification number of the user's cellular telephone or other wireless handheld device may be associated with the group. Any interaction between the CGS and the user of the wireless handheld device may be then assumed to be associated with the commuting group.

Alternatively, a user may be required to enter a pass code to participate in the group. For example, when a user gets into their car for the morning commute, the user may enter a pass code that will enable the CGS to identify the user (alone or in combination with the device's mobile identification number of the user's mobile device) as a registered user of the CGS.

A registered user may optionally be a member of more than one commuter group. For example, a given commuter may commute back and forth to work on week days, may have season tickets to a local hockey team, and may commute to a vacation home on weekends. The user may thus wish to join multiple commuter groups so that the user is able to receive the benefits of the commuter groups service during several commutes. There are several ways that the CGS may correlate a given user with a particular selected commuter group. For example, where the user is required to enter a pass code to participate in a commuter group, the pass code may contain one or more characters indicative of the commuter group that the user would like to join. An example of a passcode of this nature may be 1234-1 for commuting to work, and 1234-2 for commuting to the vacation home. Clearly other passcodes may be used as well.

Alternatively, the system may determine automatically which commuting group should be used for a particular user based on a direction of travel of the user, the time of day, and the past commuting history of the user. For example, the user may be required to head South on the freeway to go to work and may be required to head North on the freeway to get to their vacation home. Similarly, the user may always leave home for work at 7 AM, while always leaving home for a hockey game at 6 PM. Other mechanisms may be used as well and the invention is not limited to the particular way in which the CGS selects between alternate commuter groups for a particular user.

Optionally, the user may not be required to be a permanent member of a commuter group to take advantage of the system. For example, if a user is required to travel to a different city, the user may log into the CGS and enter the starting location and ending destination of an anticipated commute to the new community. The CGS may then compute a preferred route for the user, provide the route to the user, and select one or more candidate commuter groups that the user may elect to join for the trip to the new city. The candidate commuter groups may cover the entire trip or segments of the trip between the cities. As the user travels between the cities the CGS may monitor the user's progress and provide location specific advertising, notifications, and access to location specific commuter groups to enable the user to have access to the benefits of the CGS system when traveling along an unfamiliar route. Similarly, a user that purchases tickets to an event may be provided with a one time pass code to a commuter group in connection with the purchase of the ticket. The one time pass code may enable the user to participate in the commuter group while commuting to the event to enable the user to obtain the benefits of the commuter group during that one instance.

The advantages of the CGS system to a transient user may be manifest in enabling the user to request directions from group members. For example, as the user arrives at a new city having unknown traffic patterns, the user may request help from the other group members to navigate through particularly difficult intersections and during other times. Alternatively, the CGS system may be provided with a module to enable the CGS to instruct the user to be in a particular lane to enable the user to traverse the intersection.

Regardless of what group the user has joined, whether permanently or on a temporary basis, participation in the group may take the form of user/system interactions (220) and group member interactions (230). Although particular actions have been designated as either user/system and user/group member, the invention is not limited in this manner.

The user/CGS may interact in many different ways. For example, the user's position may be tracked by the system to determine congestion and travel times between particular areas (222). Based on the CGS's calculation of congestion and travel times, the CGS may provide the users with suggested route advice to enable the group members to optimize their commute (224). The users may also be provided with live video feed of portions of their route or their group of alternate routes (such as shown in FIGS. 2 and 3) to enable the users to determine which route is more likely to provide a better way to travel (226). Additionally, contacts between group members may be passed through the CGS (228), for example to enable group members to be able to communicate with each other more easily and/or anonymously.

Although the CGS has been described as being designed to provide truthful information to commuters, the invention is not limited in this manner as the CGS may also be designed to provide false information designed to distribute traffic more evenly across roads in a particular city.

Interactions between group members (230) such as between a particular user and other members of a commuter group may take on many different forms. For example a user may signal its presence to the other group members to enable instant messaging and other messaging to take place between the user and the other group members (232). Similarly, this function may be performed on the user's behalf automatically by the CGS if desired by the user. For example, the user may specify in its profile whether the user would like the CGS to signal other group members when the user begins commuting.

The user may also request help or respond to requests for help from other group members (234). The ability to request help may be implemented via instant messaging or through another special emergency messaging channel. For example, a user may elect to not participate in general instant messaging transmissions with other group members, but still may be provided with emergency assist request messages.

Users may arrange car pools and arrange ride share arrangements with each other (236) to enable the group members to cooperatively commute when necessary or convenient. Users may also share information about traffic conditions, road conditions, and hazards (238) to enable group members to collectively avoid trouble spots on their daily commute. Users may also share routes and other commuting related information with each other (240) to enable the scope of the commuter group to grow and adjust to accommodate more than one way to commute between two points or to/from a particular event.

Although particular examples have been provided about how users may use the CGS once commuter groups have been established, the invention is not limited in this manner as users may use the CGS in many different ways to improve their commutes. Additionally, within a group other sub-groups may be established that will enable sub-groups of the larger commuting community to be established so that those members may have a more intimate commuting experience. One example of this may entail enabling a group with a particular interest in sports to form a sub-group within a larger commuting group so that the sub-group may engage in a group discussion about that sport as they collectively commute to work. The invention is thus not limited to the particular described embodiment, as many different additional features may be added as well.

FIG. 8 illustrates a process performed by the commuter groups service 40. The process may be implemented using standard computer programming techniques or other techniques and the invention is not limited by the particular way in which the process is implemented. The commuter groups service process (300) shown in FIG. 8 may be instantiated on a computer platform and be configured to perform services on demand, as new information is received, according to a predetermined schedule, or in another manner. The illustrated process in FIG. 8 is intended to illustrate an example of an embodiment of the invention, rather than to show the invention itself, and other implementations of the commuter groups service process may perform fewer or additional actions. Thus, the invention is not limited to the particular embodiment shown in FIG. 8.

In the embodiment shown in FIG. 8, when the commuter group service process (300) receives a log-in request, the CGS process 300 will authenticate the user (302). Authentication may be performed in many different ways as discussed above and the invention is not limited to the use of a particular authentication process.

Optionally, the manner in which a user is allowed to participate in the groups may depend on the level of authentication associated with the user. For example, a user may automatically be authenticated when the user's cellular telephone, blackberry, or other electronic device registers on a wireless network. With this level of authentication the user may be provided with basic information that is broadcast to group members and allowed to contact other group members. However, the CGS process may require a higher level of authentication to enable the user to change its profile at the CGS service. Thus, differentiated participation may be enabled based on the level of trust established between the CGS and the user.

Once authenticated, the CGS process 300 will determine if the user is a new user (304) and, if so, create a profile for the user (306). If the user is not a new user and, hence is recognized by the CGS process, the CGS process will retrieve the user's profile (308) and, if necessary, retrieve the group profile information for groups associated with the user if those group profiles are not already loaded in memory or otherwise available to be accessed by the CGS process (310). When the login process has completed, the CGS process will return and await additional login attempts by other users.

The CGS process may perform certain processes (312) on behalf of group members without requiring group members to initiate the actions. Alternatively, the CGS process may initiate action upon request from group members (314). Each of these modes of operating will be described below.

The CGS process may be configured to perform certain processes automatically (312). For example, as shown in FIG. 8, the CGS process may be configured to transmit traffic/route information to group members based on the expected commute of those group members (320). The CGS process may also receive position data from group members and monitor the position data to collect traffic information (322). The CGS process may also transmit video information associated with a particular commute or a portion of a commute to group members associated with that commute (324). The CGS process may also determine which group members are active, such as by monitoring the log-in process or monitoring the location of the group members (322), and transmit presence information to the other group members (326). Notifying other group members which group members are currently commuting may help group members communicate with each other while commuting together.

The CGS process may also respond to user input (314). For example, if a group member sends an outgoing instant message (IM) to another group member (330), the CGS process may receive the IM from the sender, translate the recipient's assigned IM address to its real IM address and forward the IM to the recipient over a wireless network (332). Similarly, if a group member makes a telephone call to another group member (340), the CGS process may connect the telephone call by translating the CGS assigned telephone number to a real telephone number, and connect the call to the called group member (342). The CGS process may facilitate communication between group members in other ways as well and the invention is not limited to an embodiment that performs only these particular functions.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-readable medium containing instructions for controlling at least one processor to perform a method of enabling groups of commuters to communicate with each other, the method comprising the steps of:
  receiving commuting information about a first commuter;
  assigning the first commuter to a first commuter group associated with other commuters who commute independently from the first commuter but have a commuting pattern similar to the first commuter; and
  while the first commuter is commuting, enabling communication between the first commuter and other independently commuting commuters of the first commuter group;
  wherein the first commuter and the other independently commuting commuters are commuting in separate vehicles.

2. The computer readable medium of claim 1, wherein the method further comprises the step of providing information relevant to the common commuting pattern to the commuters assigned to the commuter group.

3. The computer readable medium of claim 2, wherein the step of providing information comprises at least one of providing video information of the commuting pattern to the commuter, providing a congestion indication to the commuter, providing an estimate travel time to the commuter, and providing contact information about other commuters of the commuter group.

4. The computer readable medium of claim 1, wherein the common commuting pattern is associated with commuters having a common destination, said common destination comprising at least one of a sporting event and a concert event.

5. The computer readable medium of claim 1, wherein the common commuting pattern is associated with commuters having similar starting points and similar destinations, said similar starting points being associated with a residential area and said similar destinations being associated with work areas.

6. The computer readable medium of claim 1, wherein the common commuting pattern is associated with a mode of travel.

7. The computer readable medium of claim 6, wherein the mode of travel includes private transportation.

8. The computer readable medium of claim 6, wherein the mode of travel includes at least one segment of public transportation.

9. A method of enabling commuter groups, the method comprising the steps of:
receiving commuting information about a first commuter;
comparing the commuting information about the first commuter with commuting information associated with established commuting groups to determine if the commuting information about the first commuter is similar to commuting information associated with any of the established commuting groups;
assigning the first commuter to a first commuter group associated with other commuters who commute independently from the first commuter but have commuting information similar to the commuting information associated with the first commuter; and
while the first commuter is commuting, enabling communication between the first commuter and other independently commuting commuters of the first commuter group;
wherein the first commuter and the other independently commuting commuters are commuting in separate vehicles.

10. The method of claim 9, wherein the method further comprises the step of monitoring movement of the commuters.

11. The method of claim 10, wherein the step of monitoring movement of the commuters comprises collecting location information of the commuters.

12. The method of claim 11, further comprising the step of transmitting location specific information to the commuters based on the location information.

13. The method of claim 11, further comprising the step of determining proximity information of commuters in a commuter group.

14. The method of claim 11, further comprising the step of transmitting information associated with the determined proximity information to select commuters that have been determined to be sufficiently proximate with each other.

15. A commuter groups service configured to enable commuters to join commuter groups to facilitate dissemination of commute specific information to the commuters, comprising:
a computer platform including a processor and a memory, said processor containing control logic configured to receive commuting information about a commute of a first commuter, assign the first commuter to a first commuter group associated with other commuters having a commute similar to the first commuter's commute, and disseminate commute specific information relevant to the first commuter group;
wherein the control logic is further configured to create a new commuter group for the first commuter if the commuting information about the commute of the first commuter is at least not the same as commuting information associated with any established commuter group; and
wherein the control logic configured to create the new commuter group is further configured to enable the first commuter to specify criteria about commuter interests that other commuters must possess to be allowed to join the new commuter group.

16. The computer readable medium of claim 15, wherein the processor contains control logic configured to search for a set of candidate commuter groups based on the received commuting information about the first commuter.

17. The computer readable medium of claim 16, wherein the control logic is further configured to enable the first commuter to select one or more candidate commuter groups; and wherein the control logic that is configured to assign the first commuter to the first commuter group includes control logic configured to assign the first commuter to at least one of the selected candidate commuter groups.

18. The computer readable medium of claim 16, wherein the control logic is further configured to search for a second set of candidate commuter groups upon request from the first commuter.

19. A commuter groups service configured to enable commuters to join commuter groups to facilitate dissemination of commute specific information to the commuters, comprising:
a computer platform including a processor and a memory, said processor containing control logic configured to receive commuting information about a commute of a first commuter, assign the first commuter to a first commuter group associated with other commuters having a commute similar to the first commuter's commute, and disseminate commute specific information relevant to the first commuter group;
wherein the control logic is further configured to create a new commuter group for the first commuter if the commuting information about the commute of the first commuter is not similar to commuting information associated with any established commuter group; and
wherein the control logic configured to create the new commuter group is further configured to enable the first commuter to specify criteria about commuter interests that other commuters must possess to be allowed to join the new commuter group.

* * * * *